April 15, 1952     T. WILKES     2,592,778
SURGICAL INSTRUMENT
Filed April 12, 1950
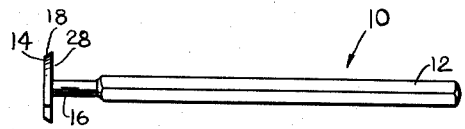
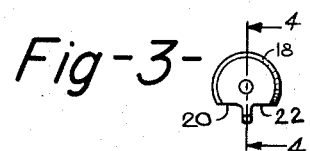
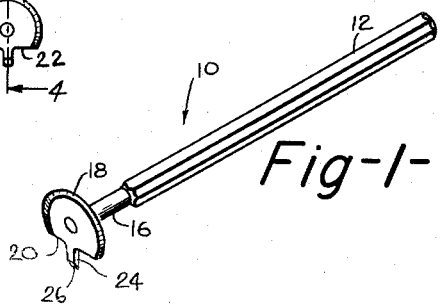
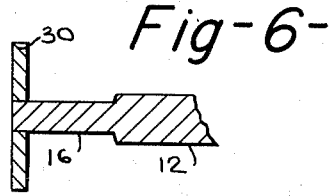
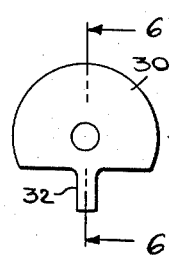
INVENTOR.
TRAUB WILKES
BY
Dicke and Padlon
ATTORNEYS

Patented Apr. 15, 1952

2,592,778

UNITED STATES PATENT OFFICE 2,592,778

SURGICAL INSTRUMENT

Traub Wilkes, New York, N. Y.

Application April 12, 1950, Serial No. 155,390

12 Claims. (Cl. 128—304)

This invention relates to surgical instrument and more particularly to a manually operable surface scraper for use in the removal of callouses and corns and the like.

In many instances, people having callouses usually apply plasters and adhesives to soften them. The same procedure is used with respect to corns on the toes. This method while beneficial requires the wearing of plasters over a period of time with consequent discomfort to the wearer. In other instances collodion is applied directly to the callouses and corns necessitating the subsequent use of razors or similar sharp instruments to cut the softened callous or corn. In other cases, some people resort to the use of emery boards so as to sand down the callous and corn.

By my invention, I provide an easily operable, safe and simple scraping device for removing corns or for scraping callouses from the soles of the feet or other surfaces of the body.

Another object of my invention is to provide an easily made and easily operable surface scraper which can be handled by the person using the scraper, without damage of cutting or infecting the skin over which the scraper is passed.

A more specific object of my invention is to provide a callous scraper having a handle from one end of which extends a substantially circular shaped member having a sharp scraping edge adapted to be passed over the surface of the callous so as to remove the same.

Further objects and advantages of a preferred embodiment of my invention will be apparent from the detailed hereinfollowing description as illustrated in the accompanying drawings, wherein:

Fig. 1 is a perspective view of a preferred embodiment of my invention;

Fig. 2 is a plan view of the embodiment shown in Fig. 1;

Fig. 3 is an end view of Fig. 1;

Fig. 4 is a section taken on line 4—4 of Fig. 3;

Fig. 5 is an end view of a modification of the embodiment shown in Fig. 1, and

Fig. 6 is a broken sectional view on line 6—6 of Fig. 5.

Referring now particularly to the drawings in which similar reference characters refer to like parts throughout, I provide a device 10 containing a stem or handle 12 on one end of which is mounted a cutter 14. Said handle and cutter may be of integral construction or may be joined together in any suitable manner such as by riveting, swaging or brazing. For purposes of illustration, it will be noted that handle 12 has a reduced portion 16 to accommodate thereon the end of the index finger of the operator when using the device. Said cutter 14, it will be noted, may be substantially in the form of a disc except for the peripheral portion 18 thereof which is recessed at 20 and 22, forming a reduced extending edge 24, having a digging and scraping end portion 26. It will be noted that said cutter 14 is of any relative thickness having a tapering or beveled edge 28 so as to permit said edge to come into direct and scraping contact with a callous upon drawing the cutter 14 across the surface of said callous. Said cutting edge may be bevelled up to 45° or it may be straight, that is, 90° with respect to the horizontal plane of the cutter as shown in Figs. 5 and 6. Said reduced blunt end 26 is adapted to permit digging into pockets containing corns without fear of excessive cutting or causing of bleeding.

In the modifications shown in Figs. 5 and 6, it will be noted that I have provided a cutter 30 having a straight edge with a peripherally extending corn removing end 32. Such modification is particularly adapted to afford a smoother scraping action over the callous.

By my invention, it will be noted that I provide a callous or corn remover which can be readily utilized in conjunction with a cream or other softening agent which is initially applied to the surface of the callous or corn. After said softening composition has penetrated the hardened tissue, the scraping device is passed across the surface of said tissue so as to practically shave the same without any fear of cutting into any softened tissue or causing bleeding of same. Said device, furthermore, can easily be handled or can be carried by the user and readily sterilized prior to use. A device of this type is easy and simple to make and can be available at all times.

Having described an illustrative embodiment of the invention, it is pointed out that various changes and modifications therein may be made without departing from the invention as set forth in the following claims.

I claim:

1. A scraper for callouses and corns and the like, comprising a handle and a beveled disc having a peripheral, cutting edge, said disc forming part of a plane perpendicular to the handle, said edge being adapted to scrape and remove callouses and corns.

2. A hardened tissue remover, comprising a handle and a beveled cutting disc having an edge forming part of a plane integral with said handle and adapted to scrape the surface of said hardened tissue so as to remove the same.

3. A hardened tissue remover, comprising a handle and a disc with a substantially circular beveled cutting edge affixed at right angles to said handle adapted to scrape the surface of said hardened tissue so as to remove the same.

4. A hardened tissue remover, comprising a handle and a substantially circular cutting edge extending perpendicularly from said handle adapted to scrape the surface of said hardened tissue so as to remove the same, said cutting edge being beveled and having a reduced beveled peripheral extension to scrape into said tissue.

5. A scraper for callouses and corns and the like comprising a handle and a cutting edge having its plane perpendicular to the handle having a circular, beveled, sharpened, outline with an extending beveled tab adapted to remove corns imbedded in the skin.

6. A callous and corn remover comprising a handle and a circular member affixed to one end of said handle, said circular member being relatively thin and having a sharpened peripheral edge for scraping across the surface of said tissue, and a reduced portion providing a peripheral extension adapted to scrape into said callous so as to remove nodules therefrom.

7. A surface hardened tissue remover comprising a handle and a circular member affixed to one end of said handle, said circular member being relatively thin and having a sharpened beveled edge for scraping across the surface of said tissue and an inwardly reduced portion providing a peripheral extension adapted to scrape into said callous so as to remove nodules therefrom.

8. A surface hardened tissue remover comprising a handle and a circular member affixed to one end of said handle, said circular member being relatively thin and having a sharpened peripheral edge for scraping across the surface of said tissue to remove the same and a reduced portion providing a beveled peripheral extension adapted to scrape into said callous so as to remove nodules therefrom.

9. A remover according to claim 8, in which the circular edge forms a section of a cylinder.

10. A remover according to claim 8 in which the circular edge of the circular member is part of a frusto conical section.

11. A callous and corn remover comprising a manually operable disc member of relatively thin material having a sharpened peripheral beveled edge around said disc for scraping across the surface of said callous or corn.

12. A callous or corn remover according to claim 11 having a reduced portion providing a peripheral beveled tab extension adapted to scrape into said callous so as to remove nodules therefrom.

TRAUB WILKES.

REFERENCES CITED

The following references are of record in the file of this patent:

UNITED STATES PATENTS

| Number | Name | Date |
|---|---|---|
| 376,320 | Langbein | Jan. 10, 1888 |
| 466,097 | Guess | Dec. 29, 1891 |
| 1,364,075 | Churchill | Jan. 4, 1921 |
| 1,476,508 | Hart | Dec. 7, 1923 |
| 2,388,292 | Sapyak | Nov. 6, 1945 |